United States Patent
Forgas et al.

(10) Patent No.: US 8,946,646 B2
(45) Date of Patent: Feb. 3, 2015

(54) SYSTEM, METHOD, AND APPARATUS FOR DETECTING NEUTRONS

(71) Applicants: Robert Forgas, Bloomington, IN (US); Joshua Liechty, Linton, IN (US); Craig R. Kline, Linton, IN (US)

(72) Inventors: Robert Forgas, Bloomington, IN (US); Joshua Liechty, Linton, IN (US); Craig R. Kline, Linton, IN (US)

(73) Assignee: Part Tec, Ltd., Greencastle, IN (US)

( * ) Notice: Subject to any disclaimer, the term of this patent is extended or adjusted under 35 U.S.C. 154(b) by 0 days.

(21) Appl. No.: 14/077,874

(22) Filed: Nov. 12, 2013

(65) Prior Publication Data

US 2014/0151565 A1     Jun. 5, 2014

Related U.S. Application Data

(60) Provisional application No. 61/724,811, filed on Nov. 9, 2012.

(51) Int. Cl.
G01T 3/06     (2006.01)

(52) U.S. Cl.
CPC .................................. *G01T 3/06* (2013.01)
USPC .................................................. 250/390.11

(58) Field of Classification Search
USPC ................. 250/361 R, 362, 390.01, 390.11
See application file for complete search history.

(56) References Cited

U.S. PATENT DOCUMENTS

| | | | |
|---|---|---|---|
| 3,398,278 A | 8/1968 | Splichal, Jr. | |
| 5,029,262 A | 7/1991 | Schulte | |
| 5,036,202 A | 7/1991 | Schulte | |
| 5,231,290 A | 7/1993 | Czirr et al. | |
| 5,264,702 A | 11/1993 | Mihalczo | |
| 5,345,084 A | 9/1994 | Byrd | |
| 5,591,967 A | 1/1997 | Moake | |
| 5,600,144 A | 2/1997 | Worstell | |
| 5,659,177 A | 8/1997 | Schulte et al. | |
| 5,680,423 A | 10/1997 | Perkins et al. | |
| 5,783,829 A | 7/1998 | Sealock et al. | |
| 5,880,469 A | 3/1999 | Miller | |
| 5,940,460 A | 8/1999 | Seidel et al. | |
| 6,078,052 A | 6/2000 | DiFilippo | |
| 6,255,657 B1 | 7/2001 | Cole et al. | |
| 6,362,485 B1 | 3/2002 | Joyce et al. | |
| 6,390,311 B1 | 5/2002 | Belokin | |

(Continued)

FOREIGN PATENT DOCUMENTS

WO     2010099334 A     9/2010

OTHER PUBLICATIONS

English abstract of JP5134049A, Sato, et al., May 28, 1993.

(Continued)

*Primary Examiner* — Mark R Gaworecki
(74) *Attorney, Agent, or Firm* — Dean McConnell IP Law

(57) ABSTRACT

A neutron detector is disclosed that includes a generally elongate sealed housing. A scintillator based neutron detection assembly is positioned within the elongate housing. The scintillator based neutron detection assembly includes a reflective portion, a plurality of optical fibers, and a scintillator portion. A fiber guide is connected with an end of said scintillator based neutron detection assembly and an end of the at least one bundle of fibers from the plurality of optical fibers is positioned in an output port in the fiber guide. A sensor assembly is included and is connected with the end of the bundle of fibers. An output connector is located on a front end of the generally elongate sealed housing for transmitting an output voltage in response to a neutron event.

18 Claims, 12 Drawing Sheets

(56) References Cited

U.S. PATENT DOCUMENTS

| | | |
|---|---|---|
| 6,495,837 B2 | 12/2002 | Odom et al. |
| 6,529,573 B2 | 3/2003 | Olsher et al. |
| 6,566,657 B2 | 5/2003 | Odom et al. |
| 6,639,210 B2 | 10/2003 | Odom et al. |
| 6,909,098 B2 | 6/2005 | Bross et al. |
| 6,924,487 B2 | 8/2005 | Bolozdynya et al. |
| 6,927,398 B2 | 8/2005 | Katagiri |
| 6,989,541 B2 | 1/2006 | Penn |
| 7,026,627 B2 | 4/2006 | Fowler, Jr. et al. |
| 7,141,799 B1 | 11/2006 | Neal et al. |
| 7,244,947 B2 | 7/2007 | Polichar et al. |
| 7,288,771 B2 | 10/2007 | Neal et al. |
| 7,326,933 B2 | 2/2008 | Katagiri et al. |
| 7,351,982 B2 | 4/2008 | Hofstetter et al. |
| 7,372,040 B2 | 5/2008 | Polichar et al. |
| 7,501,077 B1 | 3/2009 | Hodges et al. |
| 7,514,694 B2 | 4/2009 | Stephan et al. |
| 7,521,686 B2 | 4/2009 | Stuenkel et al. |
| 7,525,101 B2 | 4/2009 | Grodzins |
| 7,626,178 B2 | 12/2009 | Ivan et al. |
| 7,667,206 B1 | 2/2010 | Hindi et al. |
| 7,679,064 B2 | 3/2010 | Katagiri |
| 7,696,486 B2 | 4/2010 | Dangendorf et al. |
| 7,723,691 B2 | 5/2010 | Tonami |
| 2002/0121604 A1 | 9/2002 | Katagiri |
| 2004/0238751 A1* | 12/2004 | Penn ................... 250/390.01 |
| 2005/0224719 A1 | 10/2005 | Polichar et al. |
| 2005/0258372 A1 | 11/2005 | McGregor et al. |
| 2007/0029493 A1 | 2/2007 | Kniss et al. |
| 2009/0302231 A1 | 12/2009 | McGregor et al. |
| 2010/0226580 A1 | 9/2010 | Frank |
| 2012/0061580 A1 | 3/2012 | Kline et al. |
| 2012/0318993 A1* | 12/2012 | Boatner et al. ................ 250/368 |

OTHER PUBLICATIONS http://ortec-online.com/Solutions/homeland-security.aspx. Last visited Jan. 21, 2011.

http://riftechnologies.org/physics/fusor-mark3-neutron-detector.htm. Last visited Jan. 21, 2011.

http://www.analytical-online.com-Products-Analytical_instru-ortecneutron.html. Last visited Jan. 21, 2011.

http://www.canberra.com/products/1150.asp. Last visited Jan. 21, 2011.

International Searching Authority. International Search Report. PCT Patent Application No. PCT/US2011/051426. Jan. 9, 2012.

International Searching Authority. International Search Report. PCT Patent Application No. PCT/US2011/051429. Jan. 10, 2012.

International Searching Authority. International Written Opinion. PCT Patent Application No. PCT/US2011/051426 Jan. 9, 2012.

International Searching Authority. International Written Opinion. PCT Patent Application No. PCT/US2011/051429. Jan. 10, 2012.

* cited by examiner

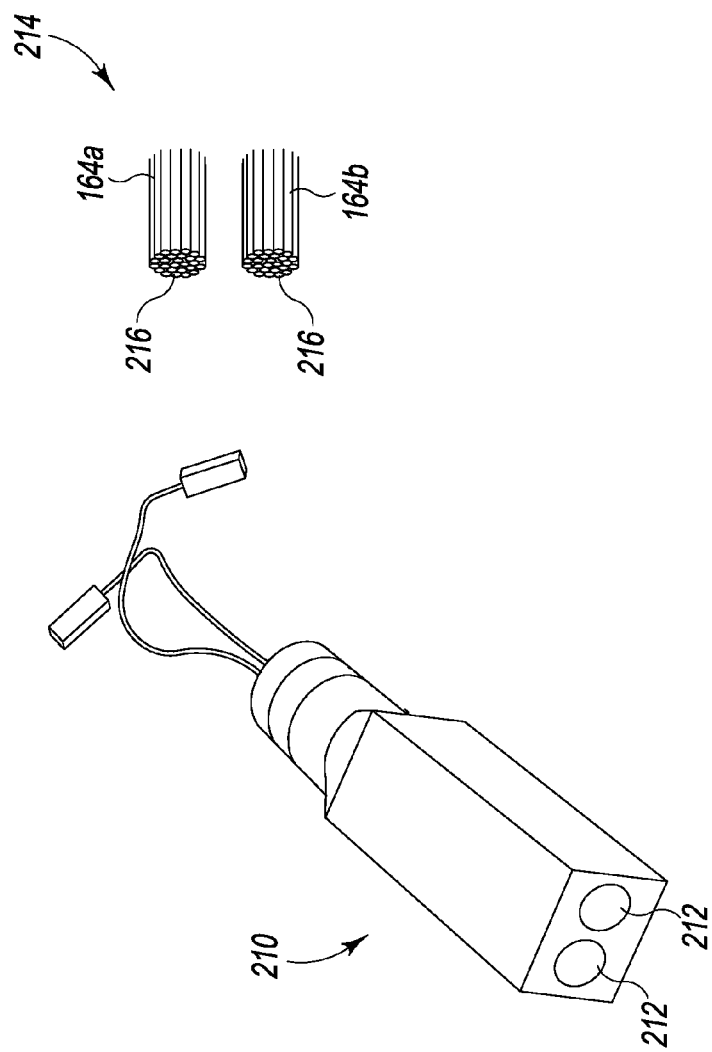

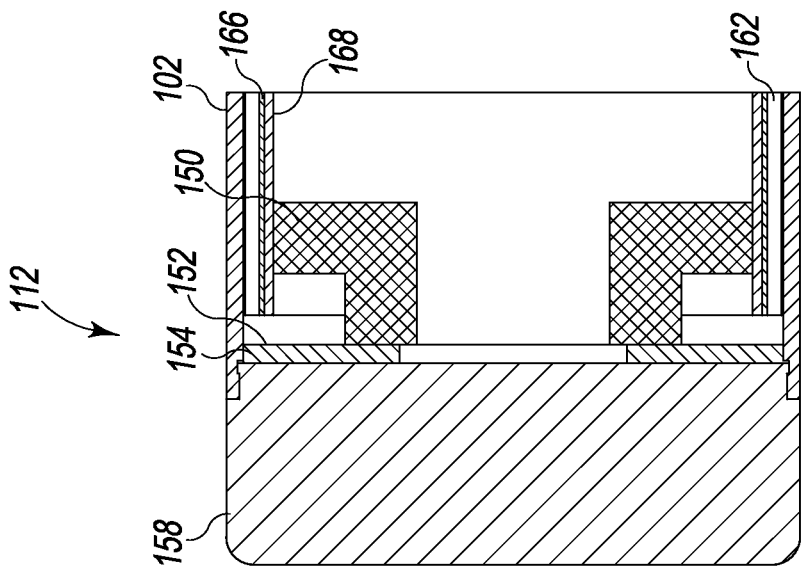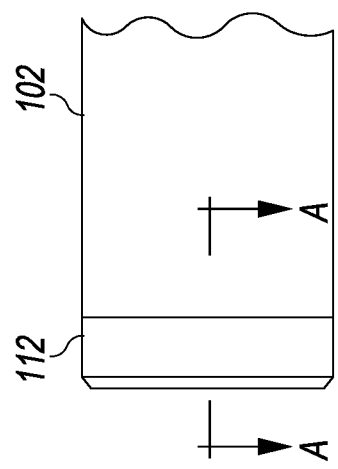
Fig. 10

SYSTEM, METHOD, AND APPARATUS FOR DETECTING NEUTRONS

CROSS REFERENCE TO RELATED APPLICATION

The present application claims the benefit of and priority to U.S. Provisional Application No. 61/724,811 filed on Nov. 9, 2012.

BACKGROUND

Neutron detection is an important function for many areas of scientific study and security functions. Detection of a neutron requires the capture of an incident neutron, determination that a neutron capture has occurred, and communication of the neutron event to an operator or output device. Presently known neutron detection devices suffer from one or more of the following drawbacks: devices have difficulty distinguishing a neutron event from a gamma radiation event, devices utilize expensive hardware and/or complex software requiring expensive hardware to operate at sufficient speeds, devices utilize bulky hardware limiting portability, devices have large and/or unusual power requirements, and/or devices have a low neutron capture efficiency. Therefore, further technological developments are desirable in this area.

BRIEF DESCRIPTION OF THE DRAWINGS

FIG. 8 illustrates a representative photomultiplier tube and fiber bundles.

FIG. 10 represents a cross-sectional view of the end cap assembly along axis A-A as illustrated.

DESCRIPTION OF ILLUSTRATIVE EMBODIMENTS

Figure 1:
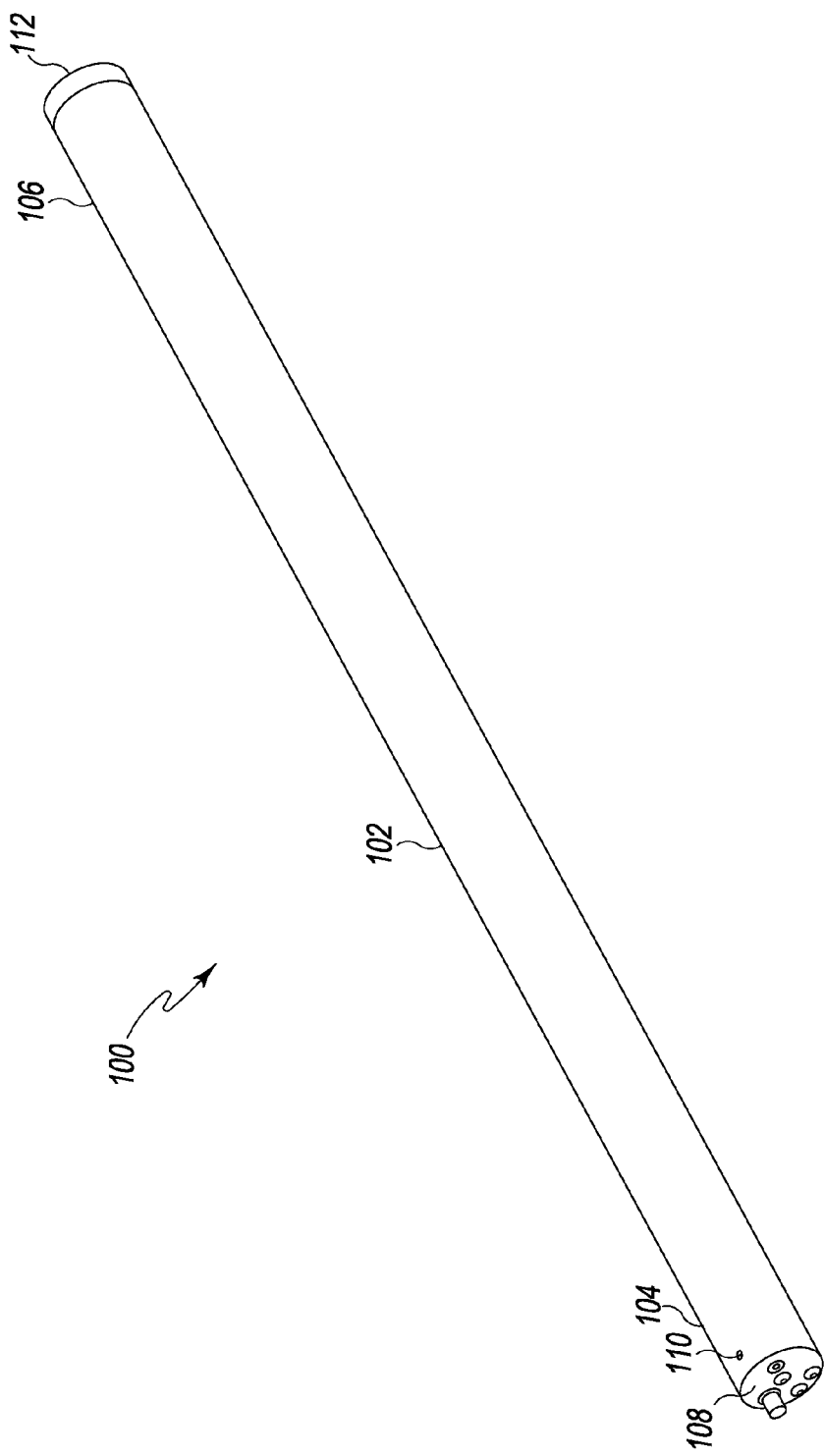
FIG. 1 illustrates a tubular shaped neutron detector.

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

Referring to FIG. 1, a neutron detector 100 is depicted that is capable of detecting neutron incidents or events. The neutron detector 100 includes an outer elongate housing or tube 102 that has a generally tubular cylindrical shape. The outer housing 102 has a proximate end 104 and a distal end 106. The tubular shape is a convenient form factor, providing for scintillator space within the tube. The proximate end 104 of the outer housing 102 includes an interface or electrical cap assembly 108 positioned within an inside diameter of the outer housing 102. The proximate end 104, in this illustrative form of the invention, is the assembly end, where electronics and other parts are inserted into the outer housing 102, and a set screw 110, or other fixing feature, is applied to finish the device assembly and fix the electronics in place within the outer housing 102. At the proximal end 106 of the outer housing 102 is an end cap assembly 112 that in this form, is press fit or friction fit within the inside diameter of the outer housing 102.

Figure 2:
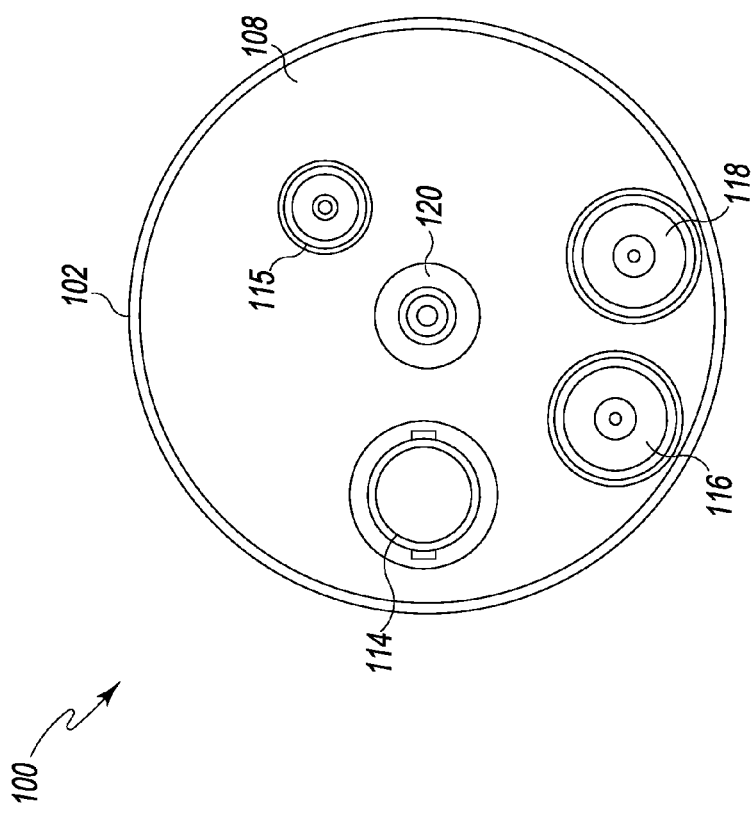
FIG. 2 illustrates the cap assembly end of the neutron detector depicted in FIG. 1.

Referring to FIG. 2, an end view of the proximal end 104 of the neutron detector 100 is depicted. An electrical output connector 114 protrudes outwardly from the electrical cap assembly 108. The connector 104 is any type of desired electrical or other output connection, and is an analog electrical connector in the example of FIG. 1 such as, by way of example, a TTL connector. In response to a neutron event, a voltage is output on the output connector 114 that can be passed to a high speed counter for example. As further illustrated, the electrical cap assembly 108 also includes a power input connector 115. As set forth in greater detail below, the power input connector 115 allows a power source to be plugged into the neutron detector 100 thereby driving the electronics within the neutron detector 100. In this form, the neutron detector 100 is powered by 12 VDC. A set screw 110 is provided to secure the electrical cap assembly 108 to the outer housing 102 but the electrical cap assembly 108 could be secured in other ways such as by a friction fit.

The electrical cap assembly 108 also includes a high voltage gain calibration rubber cap 116, a high voltage feedback rubber cap 118, and a service pull cap 120. The high voltage gain calibration rubber cap 116 provides access to an adjustment whereby the voltage of a photomultiplier tube can be adjusted. The high voltage feedback rubber cap 118 provides access to a pin socket whereby a volt meter may be placed to check the status of the voltage of the photomultiplier tube. The depicted connections are non-limiting examples, and certain connector types may be included or omitted. Further example connections or devices that may be included in the electrical cap assembly 108 of the detector 100 include any type of connector, display output (e.g. temperature, neutron count, etc.), a lamp, a speaker, or any other device known in the art.

The tube shape in the example of FIGS. 1 and 2 is circular, but any cross-sectional shape is contemplated herein, including without limitation elliptical, square, quadrangular, triangular, or other shapes. The outer housing 102 may be any material that will not block neutrons. Example and non-limiting housing materials include aluminum, certain plastics, steel or stainless steel, and/or magnesium. In certain embodiments, the housing 102 may include a neutron moderating material such as polyethylene.

Figure 3:
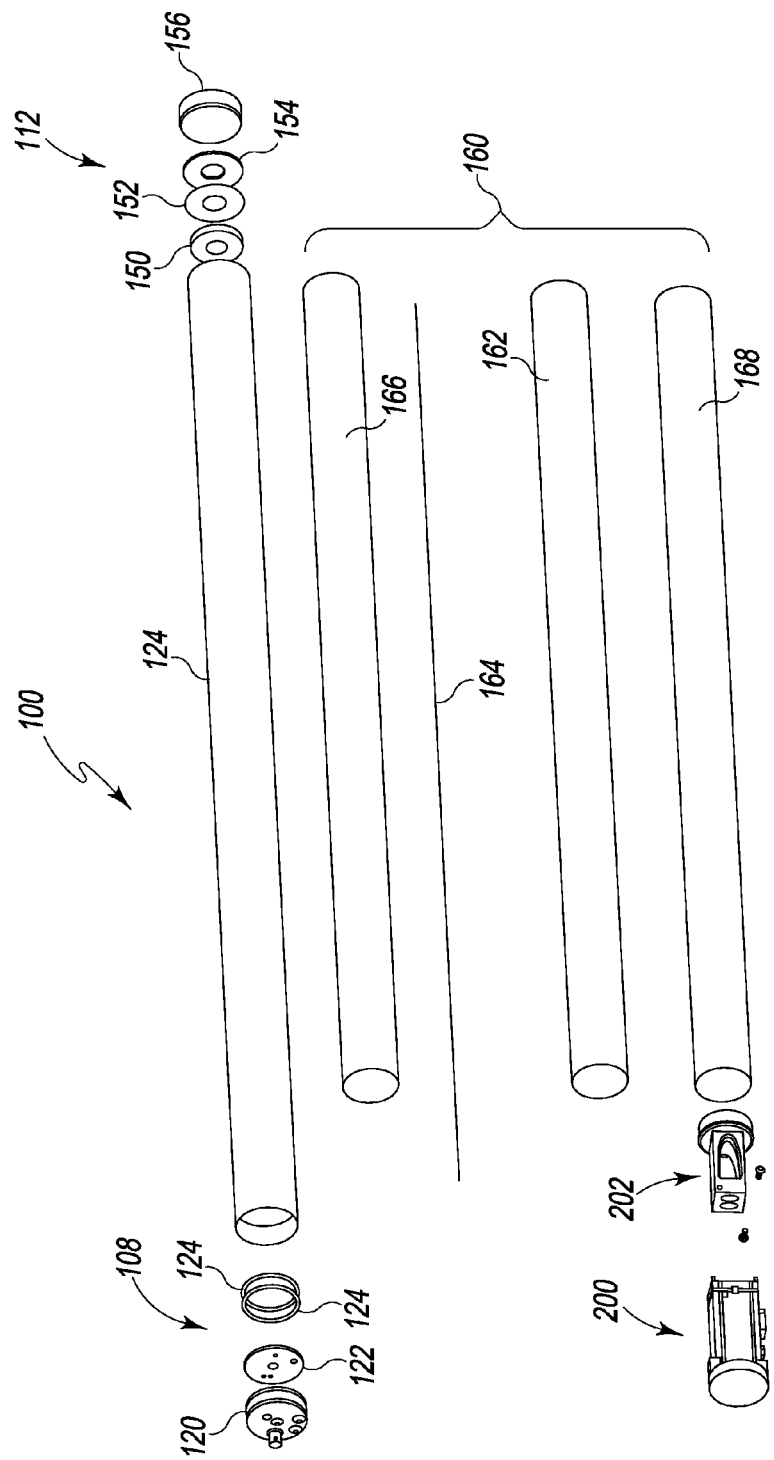
FIG. 3 illustrates a breakaway view of certain components of the neutron detector depicted in FIG. 1.
Figure 4:
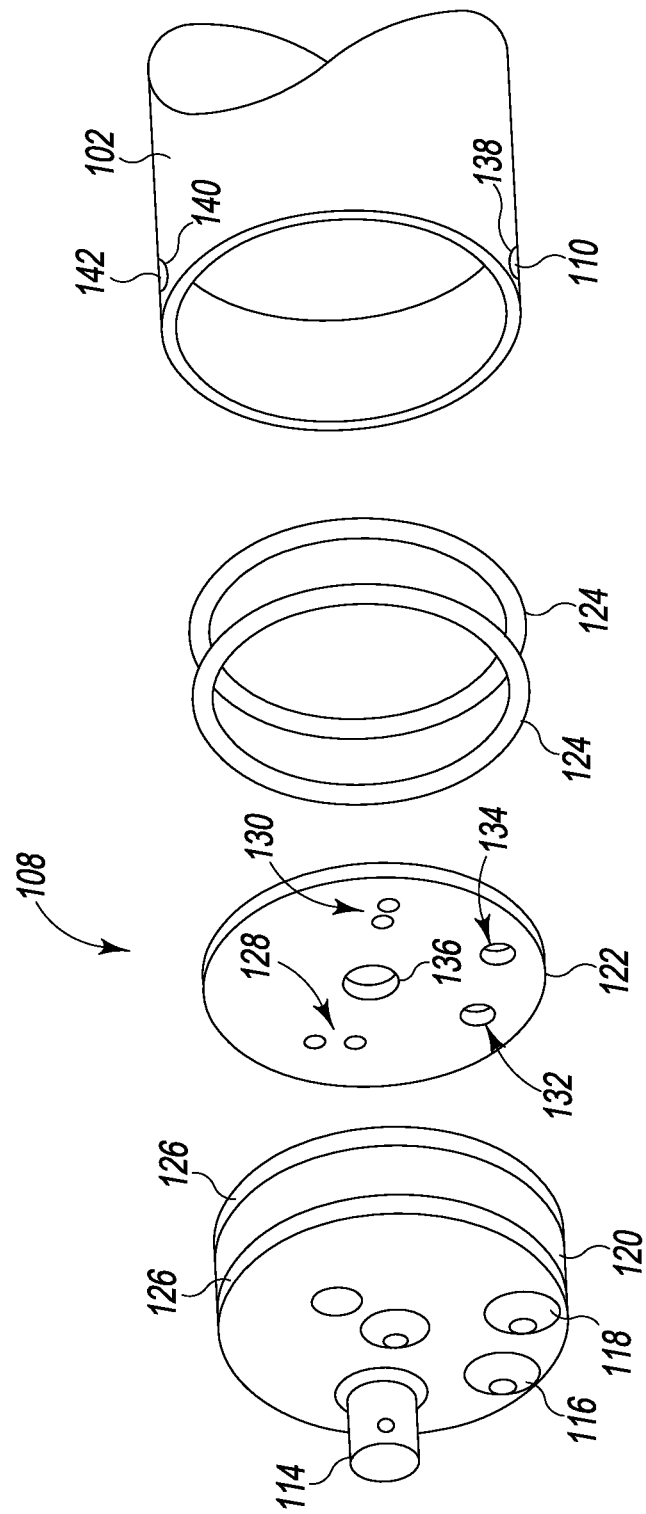
FIG. 4 illustrates a component view of the electrical cap assembly illustrated in FIG. 1.

Referring to FIG. 3, a breakaway view of certain components of the neutron detector 100 is depicted. As illustrated, the outer visible portion of the neutron detector include the outer housing 102, the electrical cap assembly 108, and the end cap assembly 112. Referring collectively to FIGS. 3 and 4, the electrical cap assembly 108 includes a front cap 120, a foam cushion 122, and a pair of O-rings 124. The front cap 120 has a generally cylindrical configuration with a certain thickness. A pair of O-ring slots 126 are included around the circumference of the front cap 120 spaced apart from one another. When assembled, the O-rings 124 are positioned in the O-ring slots 126 so that the end cap assembly 108 is sealed within the outer housing 102.

The foam cushion 122 has a generally cylindrical shape having a predetermined thickness. A pair of output signal apertures 128 are provided in the foam cushion 122 that generally line up with the electrical output connector 114. A pair of power input apertures 130 are also provided in the foam cushion 122 that generally line up with the power input connector 115. A high voltage gain aperture 132 is provided as well as a high voltage test feedback aperture 134 and a central aperture 136 in the foam cushion 122.

As further illustrated, the set screw 110 is positioned within a tube aperture 138 in the outer housing 102. As previously set forth, the set screw 110 is used to secure the electrical cap assembly 108 to the outer housing 102. A gas aperture 140 is provided in the outer housing 102 that is sealed with a sealing member 142. In one embodiment, once assembled, the interior portion of the neutron detector 100 is vacuumed out and a dry gas is injected into the interior portion of the neutron detector 100. In one form, the dry gas that is injected into the interior portion of the neutron detector 100 comprises nitrogen, but any other gas without water could be used in other forms. This is done to ensure that the internal components are not exposed to moisture thereby causing corrosion or other faults. The sealing member 142 is used to seal the dry gas in the interior portion of the neutron detector 100.

Figure 5:
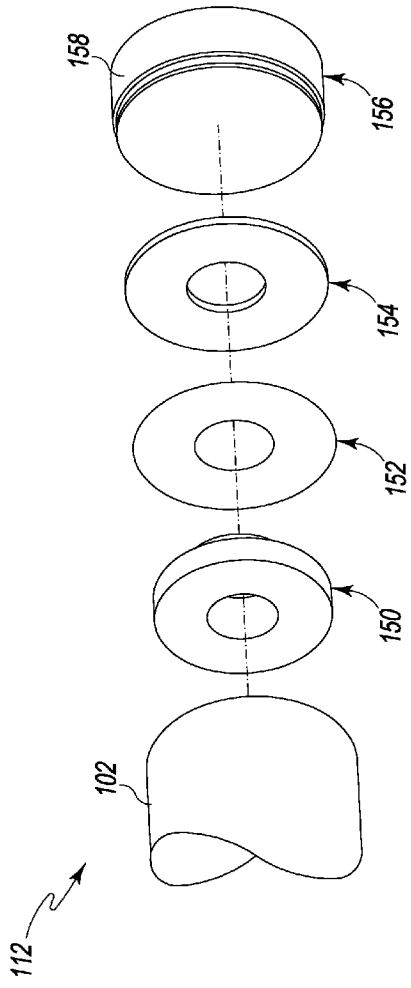
FIG. 5 illustrates a component view of the end cap assembly illustrated in FIG. 1.

Referring to FIGS. 3 and 5, a component view of the end cap assembly 112 is illustrated. As illustrated, the end cap assembly 112 includes a core-cast plug 150, a reflector disk 152, an end cap foam disk 154, and an end cap 156. The core-cast plug 150 is used to help seal the distal end 106 of the neutron detector 100. In one form, the core-cast plug 150 is made from a rubber material that is suitable for creating a friction fit seal with the inside diameter of the outer housing 102. The reflector disk 152 is positioned between the plug 150 and the foam disk 154 and is used to reflect photons back into the interior portion of the neutron detector 100. The foam disk 154 is positioned between the reflector disk 152 and the end cap 156 and is used as a protective barrier between these respective components. In alternative forms, an O-ring 158 may be included on the end cap 156 to help further seal the interior portion of the neutron detector 100. During assembly, the end cap assembly 112 may be press fit into the interior portion of the outer housing 102.

Figure 6:
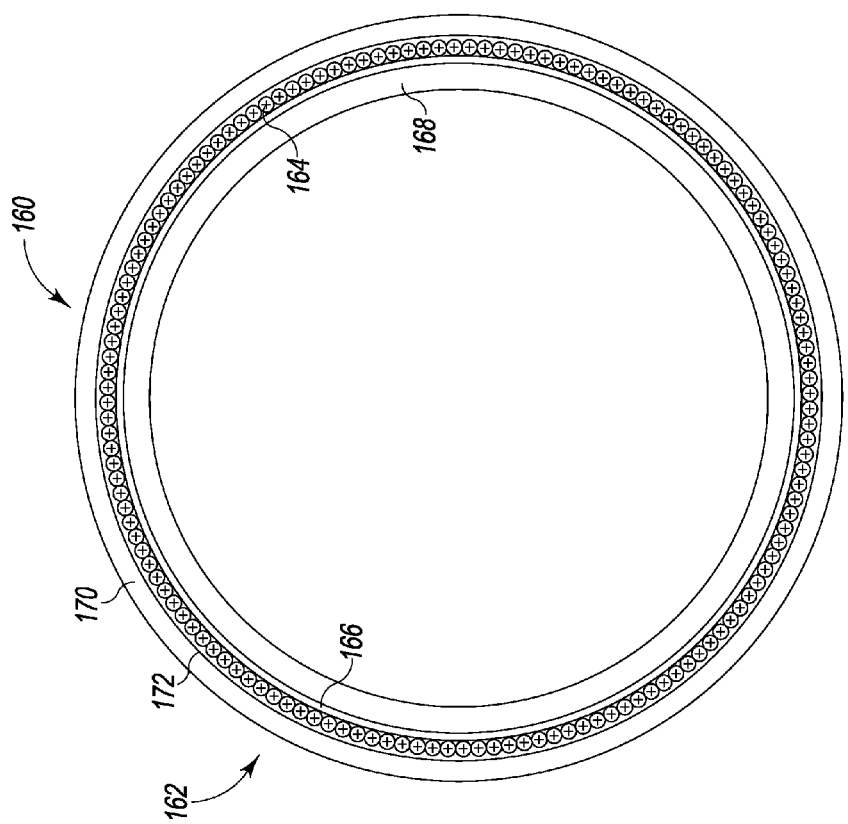
FIG. 6 illustrates a cross-sectional component view of a tubular scintillator based neutron detection assembly.

Referring collectively to FIGS. 3 and 6, a depiction of a tubular scintillator based neutron detection assembly 160 of the neutron detector 100 is illustrated. The detection assembly 160 comprises a reflector tube 162, a plurality of optical fibers 164, a scintillator tube 166, and an inner tube 168. The detection assembly 160 is configured to optimally detect ionizing radiation and, in particular, neutrons. Again, the "tubes" can take the form of various geometric shapes, however unless otherwise specified herein in the claims, tubular shapes should be viewed as a preferred or illustrative form of the present invention based on the results of experimentation unless claimed otherwise. In one form, the optical fibers 164 comprise one hundred and forty two (142) individual strands of fiber optic material that surround the circumference of an outer tube 170. In the preferred form, the optical fibers 164 comprise a wavelength shifting fiber that are designed to shift from blue light to green light.

The wavelength shifting fibers 164 emit photons of specific wavelengths axially down the fibers 164 in response to incident photons from the scintillator tube 166. The wavelength-shifting optical fibers are selected and arranged to capture a greater percentage of visible photons through the use of two or more different color stages of wavelength-shifting fibers. In the preferred form, the scintillator tube 166 comprises a flexible scintillator material that is wrapped around the inner tube 168.

Referring to FIG. 6, the reflector tube 162 comprises the outer tube 170 that includes an inner layer 172. In one form, the outer tube 170 comprises an aluminum tube however it is envisioned that other materials may be used, such as by way of example, any material that allows electromagnetic radiation to pass transparently therethrough. The inner layer 172 comprises a reflective layer of material that reflects electromagnetic radiation. In one preferred form, the reflective layer of material comprises reflective Mylar. The inner reflective layer 172 keeps photons from escaping and reflects photons back on the optical fibers 164. As a result, the inner reflective layer 172 intensifies the photons that are reflected back on the optical fibers 164. In another form, the inner layer 172 could comprise another layer of scintillator material.

Figure 7:
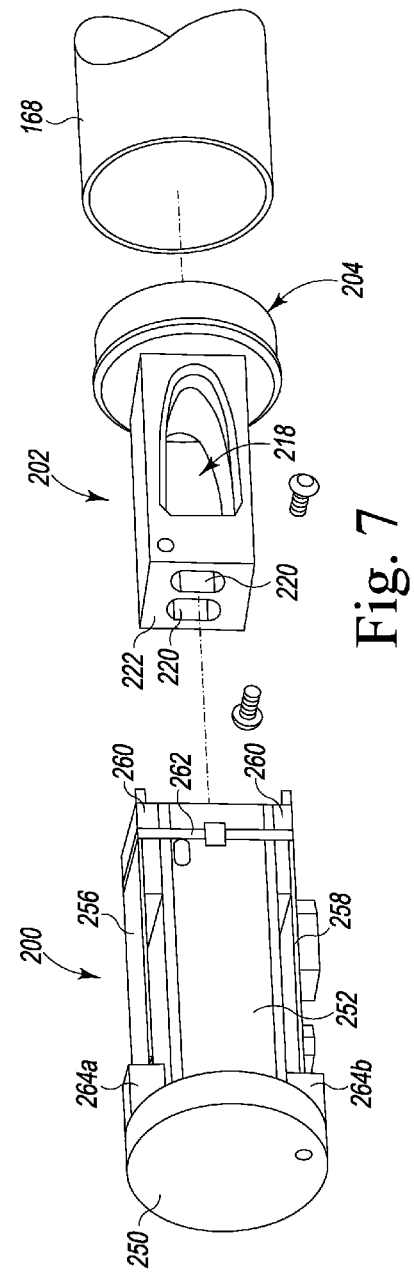
FIG. 7 illustrates the sensor assembly and photomultiplier tube fiber guide.

Referring collectively to FIGS. 3 and 7, the neutron detector 100 includes a sensor assembly 200 and a fiber guide 202. The sensor assembly 200 is designed and operable to detect neutron events and produce an output signal that is transmitted to the output connector 114 in response thereto. The fiber guide 202 includes a distal end 204 that is designed to fit within the inside diameter of the inner tube 168. Referring to FIG. 8, a photomultiplier tube ("PMT") 210 is illustrated that is housed within the sensor assembly 200. In this example, the PMT 210 comprises a two-channel PMT but it should be appreciated that two one-channel PMTs could be used in other forms. Further, in other forms, a plurality of PMTs could be used in other embodiments.

In the illustrated form, the PMT 210 includes two photo responsive inputs or anodes 212 that are capable of generating output signals in response to a neutron event. In certain embodiments, alternating ones of the fibers 164 are routed to separate photo responsive inputs 212. For example, referencing FIG. 8, a detector 100 includes bundled amounts of fibers 214, the upper bundle being a first alternating half of the fibers 164a, and the lower bundle being a second alternating half of the fibers 164b. In a further example, the detector 100 includes a stereo detection scheme, wherein photons presented simultaneously from two adjacent fibers indicate an incident neutron, and wherein photons presented in a single fiber may indicate a gamma ray radiation event, which may be considered accordingly or ignored. Further details of an example detection algorithm, a "stereo detection" scheme, are described in U.S. patent application Ser. No. 12/880,505 entitled "Neutron Detector Having Enhanced Absorption and Bifurcated Detection Elements" filed on Sep. 13, 2010, which is incorporated herein by reference in the entirety for all purposes. The use of stereo detection affords the detector with very high neutron detection efficiency, low cross-sensitivity to gamma ray detection, and the use of inexpensive scintillator materials and construction.

Referring collectively to FIGS. 7 and 8, ends 216 of the fiber bundles 164a, 164b are routed through an interior portion 218 of the fiber guide 202 to fiber output ports 220 located at a proximal end 222 of the fiber guide 202. The ends 216 of the fiber bundles 164a, 164b are placed adjacent to the photo responsive inputs 212 of the PMT 210. The fiber bundles 164a, 164b are optically isolated from one another by being positioned in the fiber output ports 220. As a result, if a neutron event occurs, light is transmitted through the fiber bundles 214 to the respective photo responsive inputs 212 of the PMT 210. An output signal is then generated by the PMT 210 that is transmitted to the output connector 114.

Figure 9:
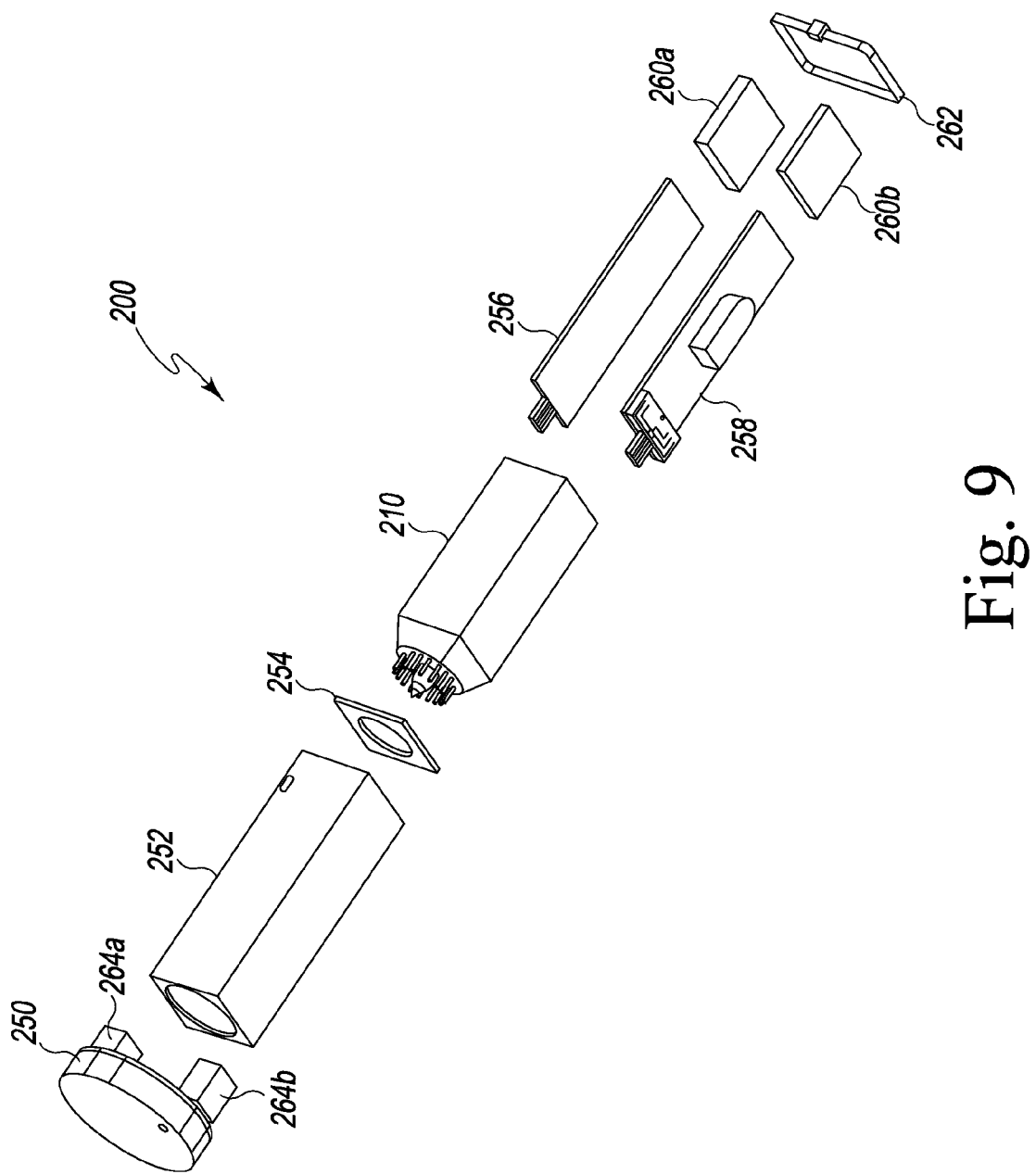
FIG. 9 illustrates a representative view of the components of the sensor assembly.

Referring collectively to FIGS. 7 and 9, a component view of an illustrative sensor assembly 200 is depicted. In this form, the sensor assembly 200 comprises a PMT base 250, a magnetic shield 252, a foam gasket 254, a two-channel PMT 210, a signal processing board 256, a high voltage supply board 258, a pair of foam pads 260, and a cable tie 262. The base 250 includes two edge connectors 264a, 264b into which connectors of the signal process board 256 and high voltage supply board 258 are connected and will be described in further detail below. The PMT 210 fits or is housed within the magnetic shield 252 and the magnetic shield serves to protect the PMT 210 from unwanted noise or interference. The foam gasket 254 is positioned between a front end of the PMT 210 and a front end of the magnetic shield 252.

The signal processing board 256 is connected with the PMT 210 and an edge connector 264a. A foam pad 260a is used to space the signal processing board 256 from the magnetic shield 252. The signal processing board 256 is configured to generate output signals in response to a neutron detection event that are then transmitted to the TTL output connector 114. Although not illustrated, the TTL output connector 114 may be connected with a high speed counter that is used to process and monitor neutron detection events. The high speed counter could be connected with a computer, or could be a card in a computer, or any other type of device that could be monitored by a user to determine how to handle or record the neutron detection event.

The high voltage board 258 is connected with the PMT 210 and an edge connector 264b. The high voltage board 258 provides power to the PMT 210. The high voltage board 258 receives its power from a power source (not shown) that is connected with the power input connector 115. A foam pad 260b is used to space the high voltage board 258 from the magnetic shield 252. The cable tie 262 is used to secure the signal processing board 256 and the high voltage board 258 to the magnetic shield 252.

Referring to FIG. 10, the end cap assembly 112 is illustrated in a cross-section view shown along axis A-A. As illustrated, the end cap assembly 112 is secured to the outer tube 102 to provide an air tight seal. The core-cast plug 150 is positioned within an inside diameter of the inner tube 168. The reflective disk 152 is positioned between the core-cast plug 150 and the foam disk 154 and covers the entire inside diameter of the outer housing or tube 102. The reflective disk 154 serves to reflect photons back into the neutron detector 100. The foam disk 154 is also positioned within the inside diameter of the outer tube 102 and is located between the thermal cap 158 and the reflective disk 154. The thermal cap 158 is located on the end of the outer tube 102 and serves to seal the outer tube 102 from the atmosphere. In this form, the thermal cap 158 is friction fit on the end of the outer tube 102 but other connection means are envisioned (e.g.—adhesives, screws, and so forth).

Figure 11:
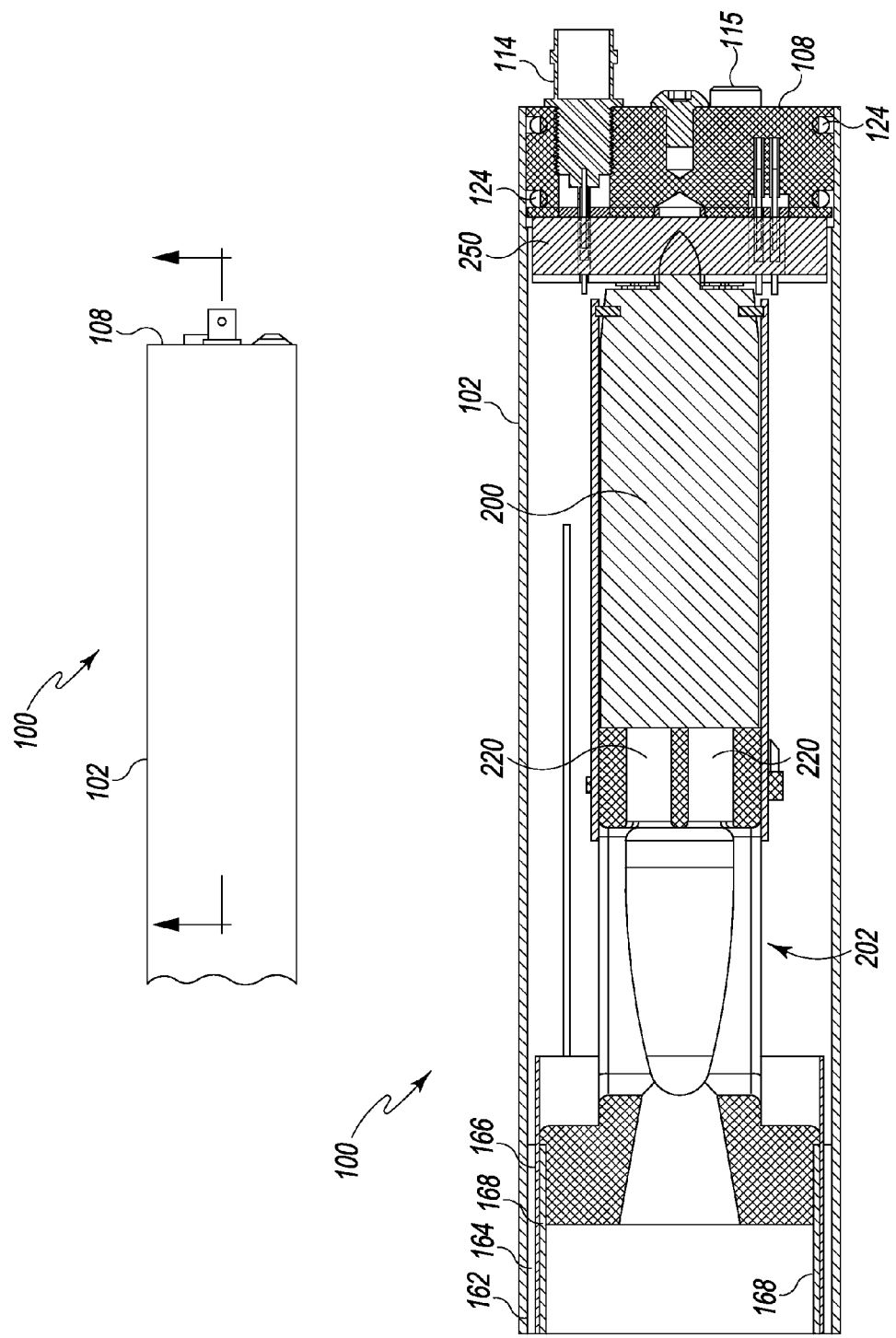
FIG. 11 represents a cross-sectional view of the neutron detector along axis B-B as illustrated.

Referring to FIG. 11, a cross-sectional view of the neutron detector 100 is illustrated along axis B-B. As illustrated, the reflector tube 162 is positioned along the inside diameter or wall of the outer tube or housing 102. The reflector disk 162 serves to reflect photons back onto the optical fibers 164. The optical fibers 164 wrap around the entire circumference of the scintillator tube 166. The scintillator tube 66 extends beyond a portion of the distal end of the PMT fiber guide 202. An end of the inner tube 168 is connected with the distal end of the PMT fiber guide 202. A proximal end of the PMT fiber guide 202 is connected with a distal end of the sensor assembly 200. A proximal end of the sensor assembly 200 is connected with the base 250.

Figure 12:
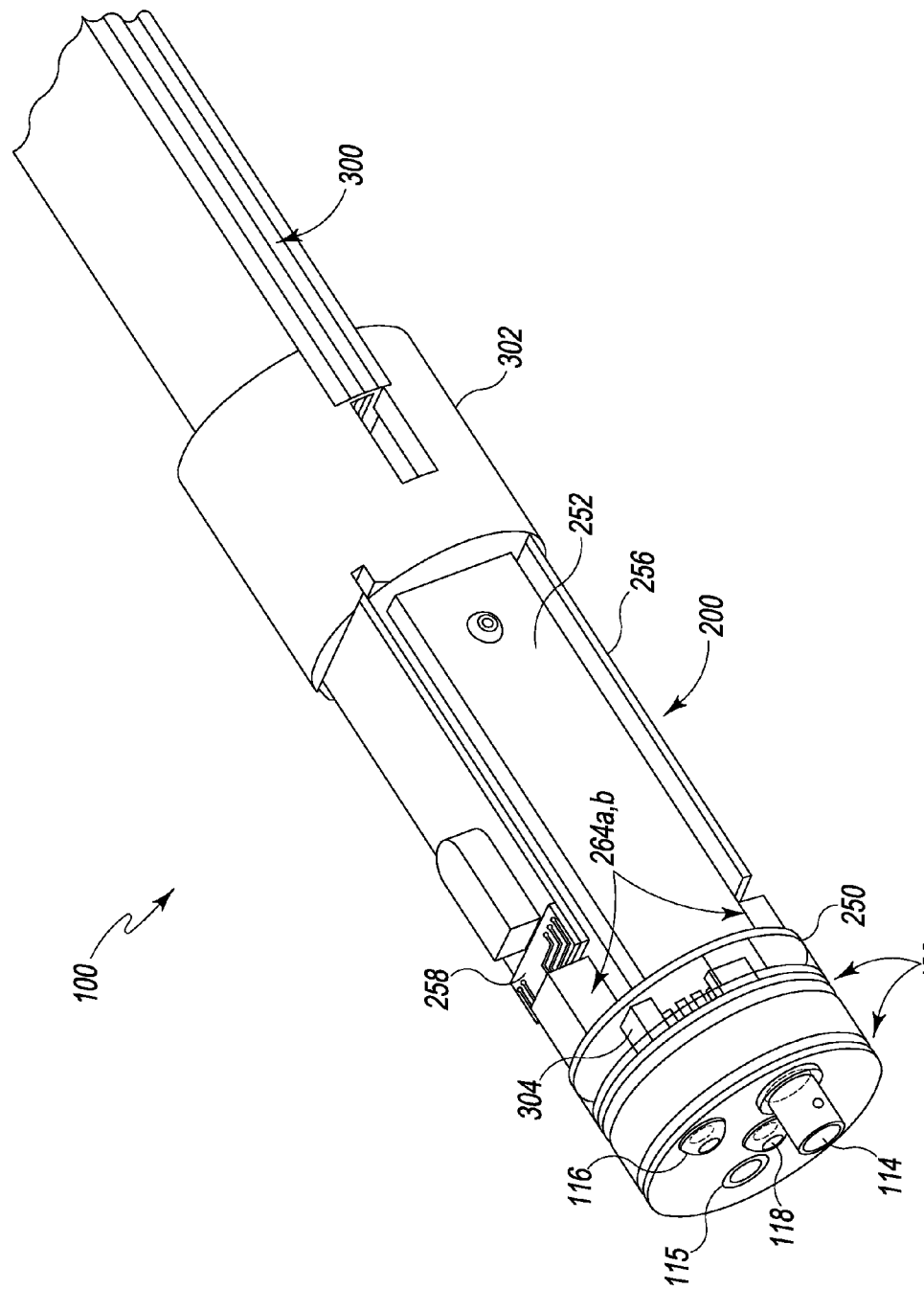
FIG. 12 represents a component view of a portion of an assembled neutron detector with the outer tube or housing removed.

Referring to FIG. 12, an assembly view of a portion of a representative neutron detector 100 is illustrated with the outer tube or housing 102 removed. In this form, a stacked scintillator assembly 300 is disclosed that is connected with a fiber interface 302. The stacked scintillator 300 includes fibers 164 that are positioned adjacent the photo responsive inputs 212 of the sensor assembly 200. As illustrated, the high voltage board 258 is positioned on top of the magnetic shield 252. The high voltage board 258 is connected with an edge connector 264 that is in turn connected with the power source connector 115 via the PMT base 250. A high voltage calibration module 304 is included on the PMT base 250 that allows a user to adjust the voltage of the PMT 210 if necessary. The user will remove the high voltage adjustment cap 116 in order to gain access to the high voltage adjustment module 304. A high voltage test feedback unit 306 is connected with the PMT base 250 and allows the user to take readings with a voltmeter of the voltage level of the PMT 210. The high voltage test cap 118 is removed in order to gain access to the high voltage test feedback unit. A potting or insulating material may be placed between the electrical cap assembly 108 and the PMT base 250.

Figure 13:
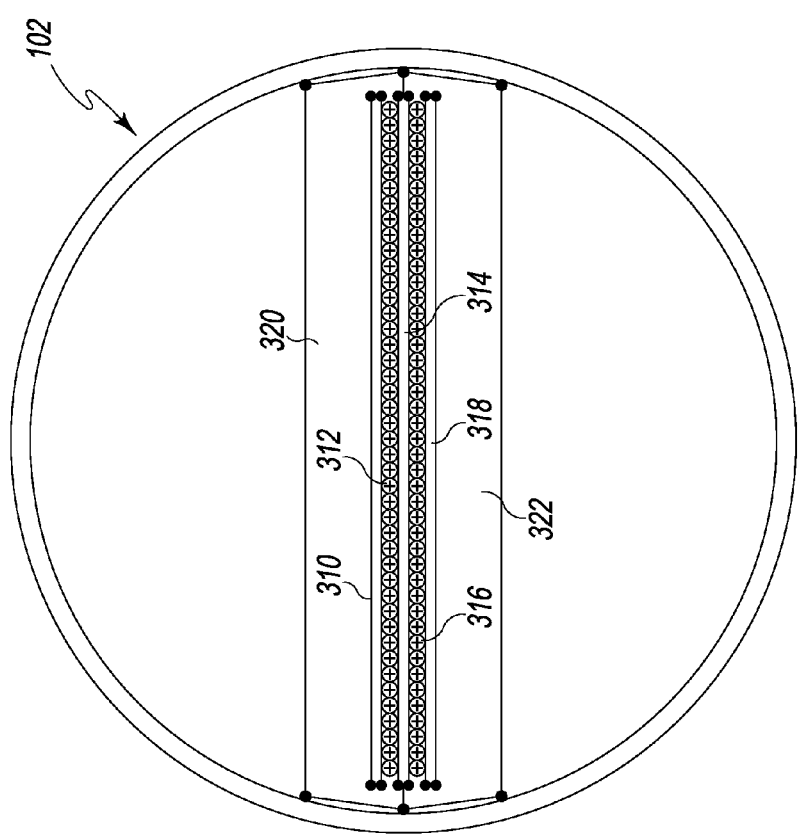
FIG. 13 represents a cross-sectional component view of a stacked scintillator based neutron detection assembly.

Referring to FIG. 13, a cross-sectional view of the stacked scintillator assembly 300 is depicted within the outer tube or housing 102. As with the other embodiment, the inner wall of the outer tube or housing 102 may be layered with a reflective material. In this form, a first scintillator layer 310 is included on top of a first layer of optical fiber 312. A second scintillator layer 314 is positioned between the first layer of optical fiber 312 and a second layer of optical fiber 316. A third scintillator layer 318 is positioned on the bottom of the second layer of optical fiber 316. This stacked scintillator arrangement is positioned within or sandwiched between an upper covering layer 320 and a lower covering layer 322. The stacked scintillator 300 extends substantially the entire length of the outer housing 102. The fibers 312, 314 are bundled together in the fiber interface 300 such that an end of the fibers is adjacent the photo responsive input of the photomultiplier tube. All other features are similar to that disclosed with respect to the previously discussed embodiment.

While the invention has been illustrated and described in detail in the drawings and foregoing description, the same is to be considered as illustrative and not restrictive in character, it being understood that only certain exemplary embodiments have been shown and described. Those skilled in the art will appreciate that many modifications are possible in the example embodiments without materially departing from this invention. Accordingly, all such modifications are intended to be included within the scope of this disclosure as defined in the following claims.

In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:
1. A neutron detector, comprising:
a generally elongate sealed housing;
a scintillator based neutron detection assembly positioned within said elongate housing, wherein said scintillator based neutron detection assembly includes a reflective portion, a plurality of optical fibers, and a scintillator portion, wherein said optical fibers are positioned between said reflective portion and said scintillator portion;
a fiber guide connected with an end of said scintillator based neutron detection assembly and positioned within said generally elongate sealed housing, wherein at least one bundle of fibers from said plurality of optical fibers is positioned in an output port in said fiber guide;
a sensor assembly connected with an end of said fiber guide such that at least one photo responsive input of a photomultiplier tube is aligned with said at least one bundle of fibers in said output port; and
an output connector located on a front end of said generally elongate sealed housing.

2. The neutron detector of claim 1, wherein said scintillator based neutron detection assembly has a tubular shape, wherein said reflective portion comprises a reflective material located on an inside wall of said elongate sealed housing.

3. The neutron detector of claim 2, wherein said scintillator portion is wrapped around an inner tube positioned within said elongate sealed housing.

4. The neutron detector of claim 1 wherein said scintillator based neutron detection assembly has a generally tubular configuration.

5. The neutron detector of claim 1, wherein said sensor assembly includes a sensor board connected with said photomultiplier tube and said output connector.

6. The neutron detector of claim 5, further comprising a high voltage board connected with said photomultiplier tube, wherein said high voltage board is operable to provide power to said photomultiplier tube.

7. The neutron detector of claim 1, wherein said photomultiplier tube is positioned within a magnetic shield.

8. The neutron detector of claim 1, wherein said optical fibers comprise wavelength optical shifting fibers.

9. The neutron detector of claim 8, wherein said wavelength optical shifting fibers are operable to shift blue light to green light.

10. A neutron detector, comprising:
a scintillator based neutron detection assembly including a reflector portion having an inner reflective layer, a plurality of optical fibers, and a scintillator portion, wherein said optical fibers are positioned between said inner reflective layer and said scintillator portion;
a fiber guide connected with an end of said scintillator based neutron detection assembly, wherein at least one bundle of optical fibers from said plurality of optical fibers is positioned in an output port of said fiber guide;
a sensor assembly connected with an end of said fiber guide such that at least one photo responsive input of a photomultiplier tube is aligned with said at least one bundle of fibers in said output port; and
an output port connected with said sensor assembly configured to generate an output signal in response to a neutron event.

11. The neutron assembly of claim 10, wherein a second bundle of optical fibers from said plurality of optical fibers is positioned in a second output port of said fiber guide.

12. The neutron detector of claim 11, wherein a second photo responsive input of said photomultiplier tube is aligned with said second bundle of optical fibers in said second output port.

13. The neutron detector of claim 12, wherein said at least one bundle of optical fibers comprises a first alternating half of said optical fibers and said second bundle of optical fibers comprises a second alternating half of said optical fibers.

14. The neutron detector of claim 13, wherein said optical fibers comprise wavelength shifting optical fibers.

15. The neutron detector of claim 10, wherein said optical fibers comprise wavelength shifting optical fibers.

16. A neutron detector, comprising:
a scintillator based neutron detection assembly including a reflector portion having an inner reflective layer, a plurality of optical fibers, and a scintillator portion, wherein said optical fibers are positioned between said inner reflective layer and said scintillator portion;
a fiber guide connected with an end of said scintillator based neutron detection assembly, wherein a first alternating half of said plurality of optical fibers is oriented in a first bundle and positioned in a first output port of said fiber guide and a second alternating half of said plurality of optical fibers is oriented in a second bundle and positioned in a second output port of said fiber guide;
a sensor assembly connected with a proximal end of said fiber guide such that a first photo responsive input of at least one photomultiplier tube is aligned with a first end of said first bundle in said first output port and a second photo responsive input of said at least one photomultiplier tube is aligned with a second end of said second bundle in said second output port; and
an output port connected with said sensor assembly configured to generate an output signal in response to a neutron event.

17. The neutron detector of claim 16, wherein said optical fibers comprise wavelength shifting optical fibers.

18. The neutron detector of claim 17, wherein said wavelength shifting optical fibers are operable to shift blue light to green light.

* * * * *